(12) United States Patent
Haag et al.

(10) Patent No.: US 8,418,525 B2
(45) Date of Patent: Apr. 16, 2013

(54) METHOD FOR TESTING THE OPERABILITY OF A TANK SHUTOFF VALVE OF A FUEL TANK SYSTEM

(75) Inventors: Silke Haag, Abstatt (DE); Andreas Pape, Oberriexingen (DE); Carsten Kluth, Stuttgart (DE); Uwe Nusser, Furtwangen (DE)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 12/806,801

(22) Filed: Aug. 19, 2010

(65) Prior Publication Data

US 2011/0067487 A1 Mar. 24, 2011

(30) Foreign Application Priority Data

Sep. 18, 2009 (DE) .......................... 10 2009 029 593
Jul. 12, 2010 (DE) .......................... 10 2010 031 216

(51) Int. Cl.
*G01L 27/00* (2006.01)
*G01M 3/04* (2006.01)

(52) U.S. Cl.
USPC ................................ 73/1.72; 73/40; 73/49.7

(58) Field of Classification Search ................... 73/1.72, 73/49.7, 114.38, 114.39, 114.42, 114.43, 73/114.77, 40
See application file for complete search history.

(56) References Cited

U.S. PATENT DOCUMENTS

| | | | |
|---|---|---|---|
| 7,162,914 B2* | 1/2007 | Streib et al. ..................... | 73/49.7 |
| 7,562,554 B2* | 7/2009 | Yoo et al. ........................ | 73/1.72 |
| 2003/0019212 A1* | 1/2003 | Baeuerle et al. ................ | 60/608 |
| 2004/0173011 A1* | 9/2004 | Nakoji ........................... | 73/118.1 |
| 2008/0264156 A1* | 10/2008 | Streib et al. ................. | 73/114.43 |

FOREIGN PATENT DOCUMENTS

| | | |
|---|---|---|
| DE | 196 36 431 | 3/1998 |
| DE | 198 09 384 | 9/1999 |

\* cited by examiner

*Primary Examiner* — Hezron E Williams
*Assistant Examiner* — David Z Huang
(74) *Attorney, Agent, or Firm* — Kenyon & Kenyon LLP

(57) ABSTRACT

A method for testing the operability of a tank shutoff valve of a fuel tank system which is controlled by valves includes performing defined triggering of the tank shutoff valve and simultaneous introduction of an overpressure or partial vacuum into the fuel tank system via a pressure source, and the operability of the tank shutoff valve is determined on the basis of a variable which characterizes the introduction of the overpressure or partial vacuum.

14 Claims, 3 Drawing Sheets

US 8,418,525 B2

METHOD FOR TESTING THE OPERABILITY OF A TANK SHUTOFF VALVE OF A FUEL TANK SYSTEM

BACKGROUND OF THE INVENTION

1. Field of the Invention

The present invention relates to a method for testing the operability of a tank shutoff valve of a fuel tank system which is controlled by valves.

2. Description of Related Art

Methods and monitoring and control systems for testing fuel tank systems are known from the related art.

Thus, for example, published German patent document DE 196 36 431 A1 discloses a method and a device for testing the operability of a tank ventilation system, in which an overpressure or partial vacuum is introduced into a tank ventilation system and the tightness of the tank ventilation system is determined from the pressure curve. The pressure curve is determined by detecting operating parameters of the pressure source upon introduction of the pressure. A method for testing the operability of a tank ventilation system of a vehicle using a tank tightness test is also disclosed in published German patent document DE 198 09 384 C2. Using a tank tightness testing device of this type, it may be reliably stated whether there is a tank leak.

More recent tank systems are equipped with an additional tank shutoff valve, which is situated between the fuel tank and an activated carbon filter, which is used for temporarily storing outgassing fuel vapors. This tank shutoff valve is normally always closed, so that significant partial vacuums or overpressures may arise in the tank system because of the leakproof tank. This valve is opened in order to regulate the pressure in the tank to a specific predefined value.

Because the tank shutoff valve represents an exhaust-relevant element, its operability must be checked.

BRIEF SUMMARY OF THE INVENTION

Using the method according to the present invention, it is possible to test the operability of the tank shutoff valve with the aid of a pressure source, implemented by a tank tightness testing device, for example, as is installed in practically all newer fuel tank systems. For this purpose, it is first tested whether opening the tank shutoff valve results in a pressure change in the fuel tank system. If not, the operability of the tank shutoff valve is determined by introducing an overpressure or partial vacuum into the fuel tank system via the pressure source and simultaneously triggering the tank shutoff valve in a defined manner on the basis of a variable which characterizes the introduction of the pressure. The variable which characterizes the introduction of the pressure is compared to a reference variable, or the time curve of the variable which characterizes the introduction of the pressure is compared to a reference curve of this variable, and the operability of the tank shutoff valve is determined on the basis of this comparison. In this regard, "determine the operability of the tank shutoff valve on the basis of a variable which characterizes the introduction of the pressure" means hereafter that a comparison of the variable to a reference value or a comparison of the time curve of the variable to a reference time curve is performed.

Thus, according to one advantageous embodiment, it is first tested whether triggering the shutoff valve to open results in a pressure change in the fuel tank system. If not, the operability of the tank shutoff valve is determined by introducing an overpressure or partial vacuum into the fuel tank system via the pressure source and simultaneously triggering the tank shutoff valve in a defined manner on the basis of the variable which characterizes the introduction of the pressure.

According to one embodiment of the method, the introduction of an overpressure or partial vacuum into the fuel tank system via the pressure source and the simultaneous defined triggering of the tank shutoff valve are performed as follows:

the tank shutoff valve is opened;
an overpressure or partial vacuum is introduced into the fuel tank system via the pressure source with the tank ventilation valve closed;
a variable which characterizes the introduction of the pressure is detected;
if the variable which characterizes the introduction of the pressure has a greater increase over time than a predefinable time gradient which characterizes an open shutoff valve, it is determined that the tank shutoff valve is jammed in the closed position;
if the variable which characterizes the introduction of the pressure does not have a different change over time than the predefinable time gradient which characterizes an open shutoff valve, the tank shutoff valve is triggered to close and it is then determined that the tank shutoff valve is jammed in the open position if the increase over time of the variable which characterizes the introduction of the pressure does not subsequently change.

The present invention is not restricted thereto, but rather it is also purely fundamentally possible to perform a test in the reverse sequence, i.e., first with a closed and then with an open tank shutoff valve. One embodiment of the method which allows this test routine provides that an overpressure or partial vacuum is introduced into the fuel tank system via the pressure source and the simultaneous defined triggering of the tank shutoff valve is performed as follows:

the tank shutoff valve is closed;
an overpressure or partial vacuum is introduced into the fuel tank system via pressure source (150) in the case of closed tank ventilation valve (140);
a variable which characterizes the introduction of the pressure is detected;
if the variable which characterizes the introduction of the pressure has a different change over time in the case of closed tank shutoff valve (120) than a predefinable time gradient which characterizes a closed tank shutoff valve (120), it is determined that tank shutoff valve (120) is jammed in the open position;
if the variable which characterizes the introduction of the pressure does not have a different change over time than the predefinable time gradient which characterizes a closed tank shutoff valve (120), tank shutoff valve (120) is triggered to open or is open and it is determined that tank shutoff valve (120) is jammed in the closed position if the increase over time of the variable which characterizes the introduction of the pressure does not subsequently change.

Therefore, precise statements about the operability of the tank shutoff valve may thus be made by targeted triggering to open and close the tank shutoff valve and simultaneous introduction of an overpressure or partial vacuum via the pressure source and detection of the time curve of a variable which characterizes the pressure.

Incorrect error messages which occur on the basis of pressure detection means, for example, pressure sensors installed in the tank, may also be prevented. Thus, for example, an error message "tank shutoff valve not opening" on the basis of a pressure change which is expected but not measured and is detected by the pressure detection means may be avoided. A non-measured pressure change may also, for example, either occur because overpressure does not prevail in the fuel tank system or the pressure detection means are defective. An overpressure or partial vacuum may be introduced into the fuel tank system in a targeted manner with the aid of the pressure source and the introduction of the pressure may be detected simultaneously. This pressure buildup, combined with the targeted triggering of the tank shutoff valve, allows prevention of incorrect error messages of this type in a particularly advantageous manner.

It is possible to detect a tank shutoff valve jammed in the open or in the closed position with the above-illustrated embodiments of the method according to the present invention.

The very advantageous embodiments of the method according to the present invention illustrated below also make it possible to detect whether there is a leakage in the tank shutoff valve and, in particular, if there is a leak into the surrounding area.

In an example embodiment of the method, a leak of the tank shutoff valve that is not jammed in the open or in the closed position is diagnosed via the following steps:

the tank shutoff valve (120) is triggered into a closed position;
an overpressure or a partial vacuum is introduced into the fuel tank system;
a variable which characterizes the introduction of the pressure is detected;
when the variable which characterizes the introduction of the pressure has a different change over time than a predefinable change over time which characterizes a closed tank shutoff valve (120), it is determined that there is a leakage at the tank shutoff valve.

By means of these method steps it may be tested whether a leakage is inward, i.e., an inward leaking tank shutoff valve, in the inside of the fuel tank system; it may also be tested whether the leakage is outward, that is the tank shutoff valve is leaking outward into the environment. Such an outwardly leaking tank shutoff valve is critical in particular since it allows fuel to escape into the environment, which must be avoided. An inward leakage, i.e., inside the fuel tank system, occurs when a tank shutoff valve does not close tightly, for example. In this case, the tank system is not tightly closed by the tank shutoff valve—still avoiding the fuel escaping outward into the environment.

In order to differentiate between whether a leak is inward or outward, an advantageous embodiment provides the following steps to check whether an inward or an outward leak exists when a leak is determined in the tank shutoff valve:

a leak diagnosis of the total area of the fuel tank system is performed during after-running using the following steps:
an overpressure or a partial vacuum is introduced into the fuel tank system;
a variable which characterizes the introduction of the pressure is detected;
when the variable which characterizes the introduction of the pressure is different from a predefinable variable which characterizes a non-leaking fuel tank system, it is determined that there is an outward leak;
when the variable which characterizes the introduction of the pressure is not different from a predefinable variable which characterizes a closed fuel tank system, it is determined that there is an inward leak.

It must be pointed out here that the comparison between the variable which characterizes the introduction of the pressure and a change over time is not to be understood as limiting.

Instead of a change over time, another variable which may be compared to the variable which characterizes the introduction of the pressure may be chosen.

According to one example embodiment, the variable which characterizes the pressure increase is detected by a pressure sensor, such as a pressure sensor which is situated in the tank. Furthermore, according to another embodiment, the variable which characterizes the pressure increase is detected on the basis of a mass flow of a pump which introduces an overpressure or partial vacuum into the fuel tank system.

The introduction of the pressure via the pressure source may be performed with the aid of a pressure source of a tank tightness testing device, for example, as installed in practically all newer fuel tank systems of vehicles.

The pressure source is advantageously formed in this case by a pump which generates an overpressure or partial vacuum in the fuel tank system and a shutoff valve of the adsorption filter of the fuel tank system. The mass flow from the tank or via a tank ventilation valve is preferably detected as the variable which characterizes the pressure increase. In addition, a pump current or the speed or the frequency of the pump which produces the overpressure or partial vacuum may be detected as the variable which characterizes the pressure increase.

DETAILED DESCRIPTION OF THE INVENTION

Figure 1:
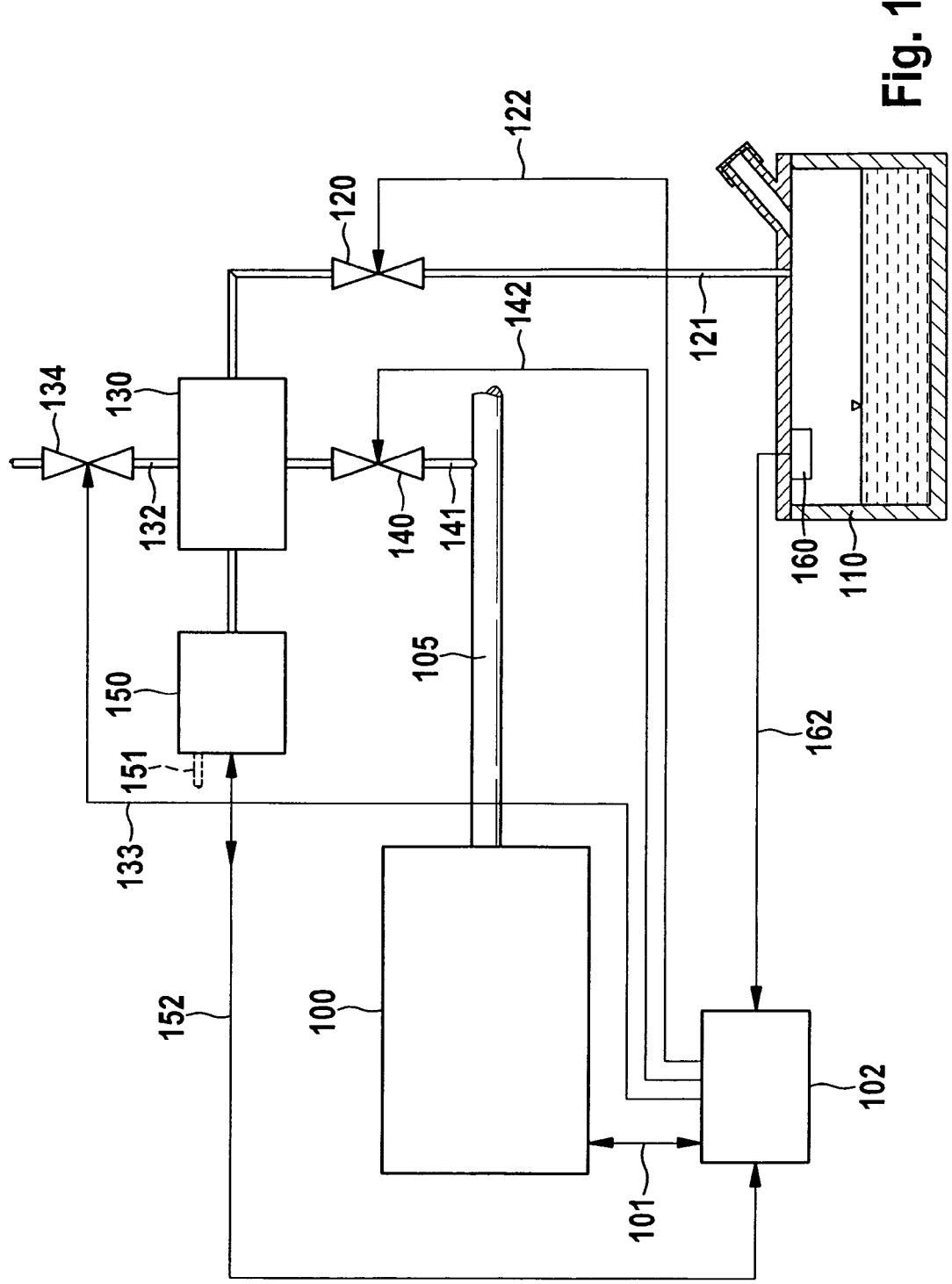
FIG. 1 schematically shows a fuel tank system in which the method according to the present invention is used.

As shown in FIG. 1, fuel tank system of a vehicle having an internal combustion engine 100 has a tank 110, in which a pressure sensor 160 for detecting the pressure in tank 110 is situated. The output signal of pressure sensor 160 is fed via an electrical line 162 to a control device, such as control unit 102 of internal combustion engine 100. Internal combustion engine 100 is triggered by control unit 102, which is symbolized by a double arrow 101. Triggered means determination and setting of the injection quantity, determination and setting of the injection time, ignition time, and the like. Tank 110 is connected via a line 121 to an activated carbon filter 130. Activated carbon filter 130 is used to adsorb harmful gases outgassed from fuel in the tank. Activated carbon filter 130 has a fresh air line 132. Fresh air line 132 is closable by a shutoff valve 134, which is activatable by control unit 102 via a control line 133. Activated carbon filter 130 is flushed from time to time. For this purpose, a tank ventilation valve 140, which is situated in a line 141, which is hydraulically connected to an intake manifold 105 of internal combustion engine 100, is opened with open shutoff valve 134 and thus open fresh air line 132 of activated carbon filter 130. A fresh air line 151 may also be part of a tank tightness testing device 150, which is also referred to as a diagnostic module tank leak (DM-TL module).

An overpressure or partial vacuum is introduced into the fuel tank system using tank tightness testing device 150 with closed fresh air line 132 or 151 and closed tank ventilation line 140. Tank shutoff valve 120 is opened for this purpose. The pressure increase upon introduction of the overpressure or partial vacuum is detected and the presence of a leak is determined from this pressure increase. The pressure increase may be detected, for example, by detecting the pump current of a pump which generates the overpressure or partial vacuum and/or by detecting a mass flow or using pressure sensor 160. The introduction of the overpressure or partial vacuum may also be performed via an arbitrary pressure source, such as a pump, instead of with the aid of tank tightness testing device 150. The above-described introduction of the overpressure or partial vacuum with the aid of the tank tightness testing device is thus only to be understood as an example, but without restriction of the generality.

Tank ventilation valve 140 and also tank shutoff valve 120 are triggered by control unit 102 using electrical control lines 142, 122. Tank shutoff valve 120 is closed during normal operation of the vehicle. Significant overpressures or partial vacuums may thus arise in tank 110. Valve 120 is opened under the control of control unit 102 in order to regulate the pressure in tank 110 to a specific, predefinable value. To meet the legal requirements, it is now necessary to test the operability of tank shutoff valve 120. This test is performed by the method described hereafter with the aid of tank pressure sensor 160 and the pressure source, for example tank tightness testing device 150, in the way described in connection with FIG. 2.

Figure 2:
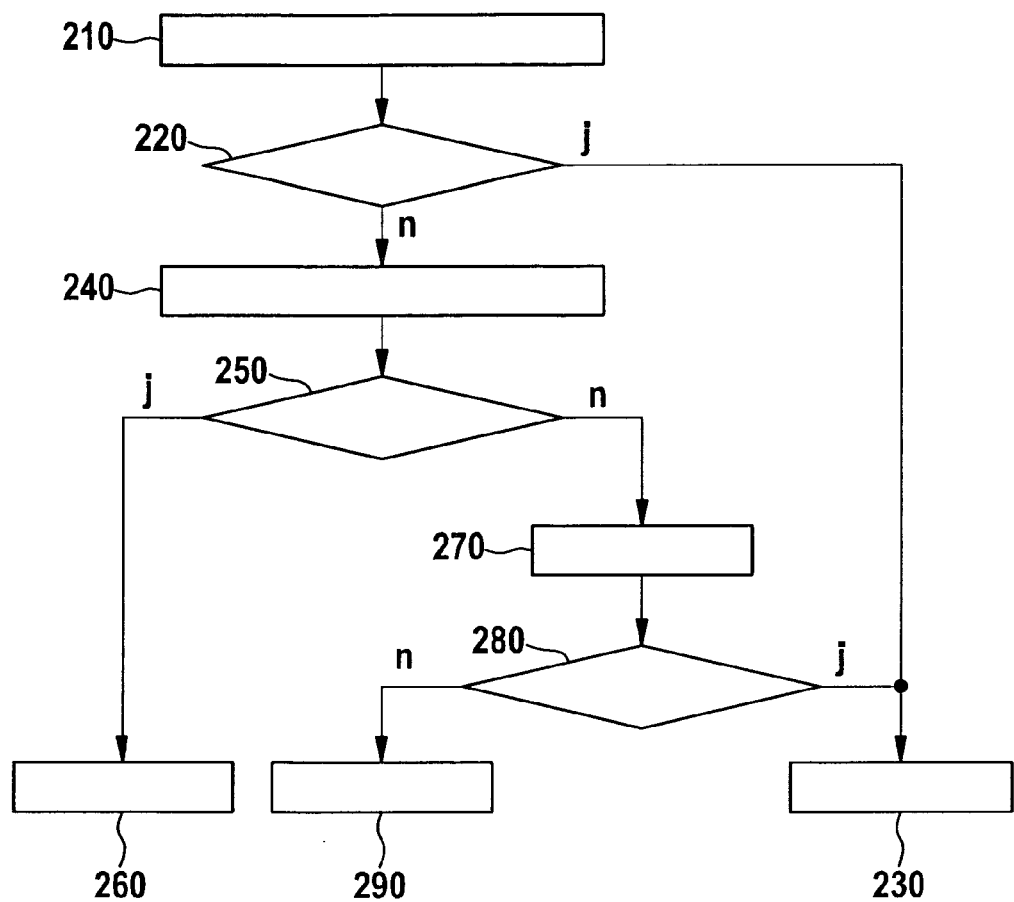
FIG. 2 shows a flow chart of an example method according to the present invention.
Figure 3:
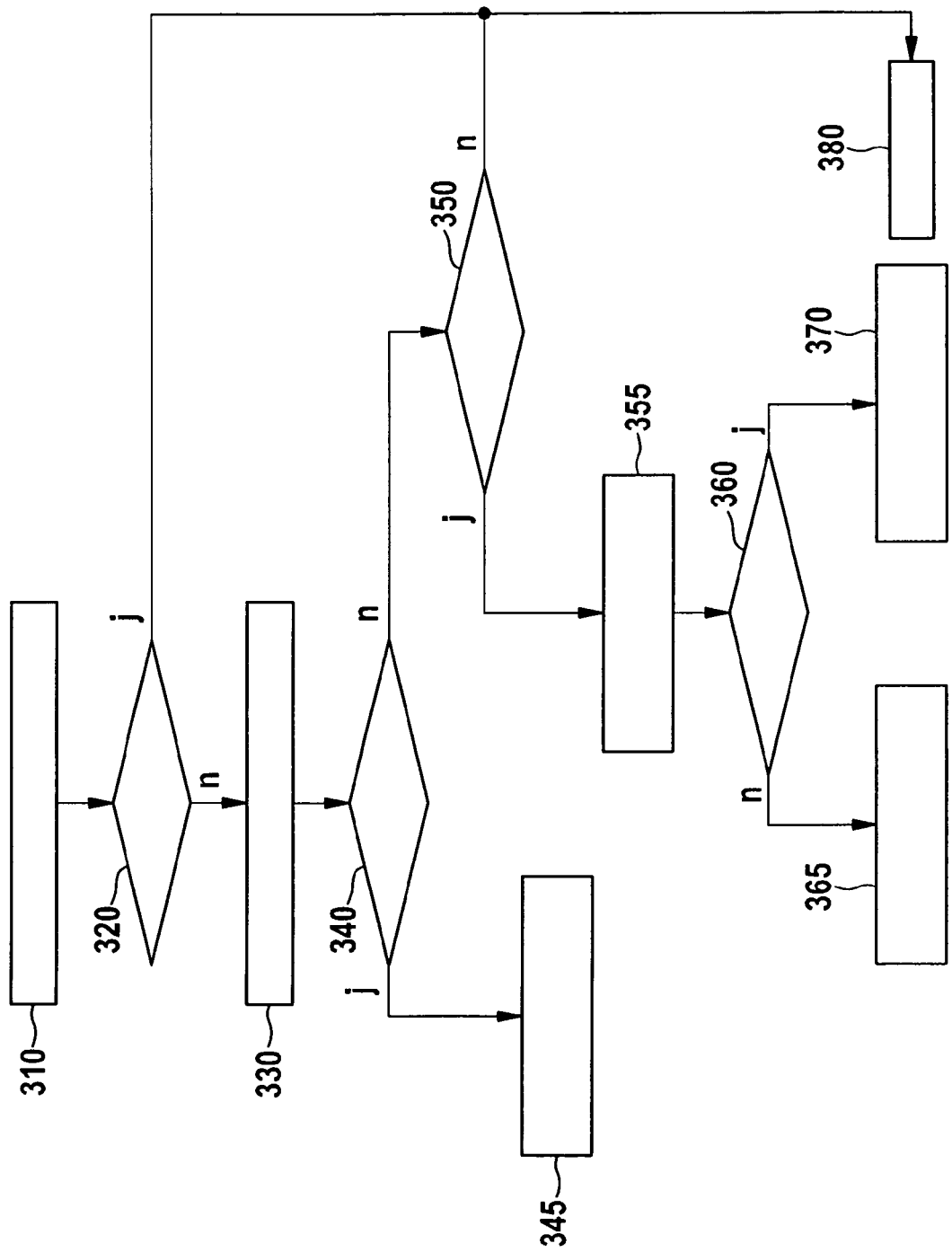
FIG. 3 shows a flow chart of a further example embodiment of the method according to the present invention.

In a first step 210 shown in FIG. 2, tank shutoff valve 120 is triggered to open and it is tested in step 220 with the aid of tank pressure sensor 160 whether a pressure change thus results in tank 110. If so, it is established in step 230 and optionally a message is output that tank shutoff valve 120 is functioning properly, i.e., it is operational.

However, if no pressure change is established in step 220, this may have the following causes. On the one hand, tank 110 may have been unpressurized, so that opening tank shutoff valve 120 does not result in a pressure change. On the other hand, tank pressure sensor 160 may be defective, so that no pressure change is measured. Thirdly tank shutoff valve 120 may also be defective. The steps described hereafter allow the errors to be narrowed down, namely a test as to whether the lack of pressure change has occurred because of a nonoperational tank shutoff valve 120. For this purpose, tank shutoff valve 120 is triggered to close or open in step 240 and the pressure source, such as tightness testing device 150, is triggered and, via this pressure source in the form of tank tightness testing device 150, an overpressure is introduced into the fuel tank system. The fresh air side is closed, i.e., line 132 or 151 is closed and tank ventilation valve 140 is additionally closed. Upon introduction of the overpressure into the fuel tank system, a variable which characterizes the introduction of the pressure, such as the electrical current of the overpressure pump, which changes over time, is detected. The change over time of the variable which characterizes the introduction of the pressure, such as a current gradient, is compared in step 250 to a predefined threshold value which characterizes an open tank shutoff valve. If the variable exceeds this threshold value, it is determined in step 260 that tank shutoff valve 120 is jammed in the closed position. The threshold value is selected so that this criterion may be recognized reliably. The threshold value is advantageously empirically determined beforehand.

In contrast, if the variable does not exceed the threshold value, tank shutoff valve 120 is triggered to close in step 270 and the change over time of the variable which characterizes the introduction of the pressure is detected, for example the above-mentioned current gradient. If the change over time of the variable which characterizes the pressure, i.e., the current gradient, for example, does not change, it may be determined in step 290 that tank shutoff valve 120 is jammed in the open position, because a closed tank shutoff valve 120 results in a further increase in the time gradient of the variable which characterizes the introduction of the pressure, for example, the current gradient. In contrast, if a change occurs, this change in turn being able to be compared to a further threshold value, for example, which is in turn previously empirically determined, it may be determined that tank shutoff valve 120 is functioning properly. A corresponding signal is produced and output in step 230 in this case.

The above-described method steps presume a test of tank shutoff valve 120 initially with an open and then with a closed tank shutoff valve. A reverse triggering of tank shutoff valve 120 is also purely fundamentally possible, i.e., the test is performed first with a closed and then with an open tank shutoff valve 120.

In this case, tank shutoff valve 120 is closed with lines 132, 151. An overpressure or partial vacuum is introduced into the fuel tank system. A variable which characterizes the introduction of the pressure is detected. If the variable which characterizes the introduction of the pressure has a different change over time when tank shutoff valve 120 is triggered to close or is closed than a predefinable and stored change over time which characterizes a closed tank shutoff valve 120, it is determined that tank shutoff valve 120 is jammed in the open position. In contrast, if the variable which characterizes the introduction of the pressure does not have a different change over time than the predefinable change over time which characterizes a closed tank shutoff valve 120, the tank shutoff valve is triggered to open or is open and it is determined that the tank shutoff valve is jammed in the closed position if the increase over time of the variable which characterizes the introduction of the pressure does not subsequently change.

In the case when there is no tank shutoff valve 120 jammed in the open or closed position, tank shutoff valve 120 may be tested for the presence of a leak, in particular an inward leak, as described below. An inward leak here means a tank shutoff valve 120 that is not tight. In this case tank 110 may not be completely tightly separated from the rest of the system. But no fuel escapes to the environment, i.e., outward. Unless tank shutoff valve 120 is closed, it is not possible to separate the tank from the rest of the fuel system in a fuel vapor-tight manner. Normally, a partial vacuum or an overpressure builds up when tank shutoff valve 120 is closed, for example, during out-gassing when the tank overheats or when there is condensation during cooling.

When measuring pressure in a fuel tank system, it is determined that tank shutoff valve 120 and the whole fuel tank system are closed, i.e., there is no leak.

However, when there is no pressure detected, which is tested in step 320 following cold engine start, step 310, it is first checked in steps 330 and 340 whether tank shutoff valve 120 is jammed in the open or closed position. The test is performed in the above-described manner. If tank shutoff valve 120 jams in the open or closed position, i.e., the query in step 340 is answered with a yes, a corresponding error entry is made in the memory (step 345) and/or a corresponding signal is given. The test is terminated. If, on the other hand, it is determined in step 340 that tank shutoff valve 120 is not jammed in an open or closed position, i.e., the query in step 40 is answered with a no, it is checked in step 350, first with the tank shutoff valve 120 triggered to close, if there is a leak. This test is performed with the aid of a tank leak diagnostic module (DM-TL module), for example, as described earlier.

If the question whether there is a leakage in step 350 is answered with no, it is determined in step 380 that fuel shutoff valve 120 does not have a leakage. If, on the other hand, the question in step 350 is answered with yes, there may be an inward or outward leakage in fuel shutoff valve 120. Inward leakage means, as already mentioned above, that there is a leakage into the inside of the fuel shutoff valve. Outward leakage means that there is a leakage into the environment. This means that the fuel may escape into the environment, which must be avoided. In order to determine whether there is an inward or an outward leakage, a leak diagnosis of the total area of the fuel tank system for a 0.5 mm leak during after-running is performed first in step 355. During after-running means that the leak diagnosis is performed when the engine is turned off in a stopped car. The leak diagnosis is performed in a manner described previously. If it is established in step 360 that there is no leak, it may be determined that fuel shutoff valve 120 has an inward leakage, which is established in step 365. In this case there is only a leak into the inside of the fuel tank system, but there is no danger of the fuel escaping into the environment. If, on the other hand, a leakage is determined in step 360, it must be assumed that that fuel shutoff valve 120 does not have an inward but an outward leakage, which means that fuel vapors may escape to the environment via fuel shutoff valve 120. This defect is established in step 370, and appropriate error entries are made in the vehicle's diagnostic memory and the malfunction will be eventually signaled to the driver of the vehicle.

The above-mentioned method variations thus make not only the detection of a leak possible but a determination whether it is an inward or outward leak in particular.

The pressure change may be detected over time, additionally or alternatively to the detection of the current gradient, with the aid of a further pressure sensor (not shown), which is situated between tank shutoff valve 120 and tank tightness testing device 150 or in tank tightness testing device 150 itself. Instead of introducing an overpressure, a partial vacuum may also purely fundamentally be built up. Instead of the current gradient, the frequency of the pump, a mass flow of the pump, or the like or their combination may also be analyzed.

Tank tightness testing device 150 may—as already noted above—additionally be formed solely by a pump and/or shutoff valve 134 on activated carbon filter 130, instead of the above-mentioned DM-TL module. Purely as a matter of principle, it is possible to measure the mass flow upstream and downstream from tank shutoff valve 120 in the case of open tank vent valve 140, for example using a suitable sensor, and thus to test the operability.

Moreover, in addition to pressure sensor 160 in tank 110 as described, above, a pressure sensor may be installed in the area between activated carbon filter 130, tank vent valve 140, and shutoff valve 120 (not shown). In this case, a partial vacuum may be built up with the aid of tank vent valve 140 when internal combustion engine 100 is running and valve 134 is closed. For this purpose, tank vent valve 140 is opened in the case of existing intake manifold partial vacuum. The partial vacuum build-up may then be analyzed using the two pressure sensors. Partial vacuum build-up means detection over time of the variable which characterizes the introduction of partial vacuum or the partial vacuum itself.

The above-described method may be implemented, for example, as a computer program on a computing device, in particular control unit 102 of internal combustion engine 100 and run thereon. The program code may be stored on a machine-readable carrier, which control unit 102 is able to read. In this way, the method may also be retrofitted in existing fuel tank systems.

What is claimed is:
1. A method for testing the operability of a tank shutoff valve of a fuel tank system which is controlled by valves, comprising:
   a) performing a defined triggering of the tank shutoff valve, wherein the defined triggering includes opening the tank shutoff valve;
   b) substantially simultaneous with the defined triggering, introducing one of an overpressure or partial vacuum into the fuel tank system using a pressure source, wherein the introduction of one of the overpressure or partial vacuum into the fuel tank system occurs with a tank ventilation valve that is closed; and
   c) determining the operability of the tank shutoff valve on the basis of a detected variable which characterizes the introduction of the one of the overpressure or partial vacuum;
   wherein if the detected variable which characterizes the introduction of the one of the overpressure or partial vacuum has a different time gradient in the case of the tank shutoff valve triggered to open in comparison to a predefined reference time gradient which characterizes an open tank shutoff valve, the tank shutoff valve is determined to be jammed in the closed position; and
   wherein if the detected variable which characterizes the introduction of the one of the overpressure or partial vacuum has a time gradient corresponding to the predefined reference time gradient which characterizes an open tank shutoff valve, the tank shutoff valve is subsequently triggered to close, and the tank shutoff valve is determined to be jammed in the open position if the increase over time of the variable which characterizes the introduction of the one of the overpressure or partial vacuum does not subsequently change.

2. The method as recited in claim 1, further comprising:
   before the defined triggering in step a), testing whether triggering the tank shutoff valve to open results in a pressure change in the fuel tank system;
   wherein, if the triggering the tank shutoff valve to open does not result in a pressure change, then proceeding with step a).

3. The method as recited in claim 1, wherein the variable which characterizes the introduction of the one of the overpressure or partial vacuum is detected by a pressure sensor.

4. The method as recited in claim 1, wherein the variable which characterizes the introduction of the one of the overpressure or partial vacuum corresponds to a mass flow of a pump introducing the one of the overpressure or partial vacuum into the fuel tank system.

5. The method as recited in claim 1, wherein a tank tightness testing device is used as the pressure source to introduce the one of the overpressure or partial vacuum into the fuel tank system.

6. The method as recited in claim 5, wherein the tank tightness testing device is formed by a pump configured to generate the one of the overpressure or partial vacuum in the fuel tank system and a shutoff valve of an adsorption filter of the fuel tank system.

7. The method as recited in claim 1, wherein the variable which characterizes the introduction of the one of the overpressure or partial vacuum is detected by detecting one of a mass flow from the fuel tank or a mass flow through the tank ventilation valve.

8. The method as recited in claim 1, wherein the variable which characterizes the introduction of the one of the overpressure or partial vacuum is detected by detecting an electrical current of a pump introducing the one of the overpressure or partial vacuum into the fuel tank system.

9. The method as recited in claim 1, wherein the variable which characterizes the introduction of the one of the overpressure or partial vacuum is detected by detecting a frequency of a pump introducing the one of the overpressure or partial vacuum into the fuel tank system.

10. The method as recited in claim 1, wherein a leak in the tank shutoff valve is diagnosed by the following steps when a tank shutoff valve is not jammed closed:
triggering the tank shutoff valve into a closed position;
introducing the one of the overpressure or the partial vacuum into the fuel tank system;
detecting the variable which characterizes the introduction of the one of the overpressure or the partial vacuum; and
determining the existence of a leak in the tank shutoff valve if the variable which characterizes the introduction of the one of the overpressure or the partial vacuum has a different time gradient than a predefined reference time gradient which characterizes a non-leaking tank shutoff valve.

11. The method as recited in claim 10, wherein if a leak is determined in the tank shutoff valve, checking whether an inward or an outward leak exists by performing a leak diagnosis of the total area of the fuel tank system during after-running, wherein the leak diagnosis includes the following steps:
introducing the one of the overpressure or the partial vacuum into the fuel tank system;
detecting the variable which characterizes the introduction of the one of the overpressure or the partial vacuum; and
determining the existence of an outward leak if the variable which characterizes the introduction of the one of the overpressure or the partial vacuum is different from a predefined variable which characterizes a non-leaking fuel tank system, and determining the existence of an inward leak if the variable which characterizes the introduction of the one of the overpressure or the partial vacuum is same as the predefined variable which characterizes the non-leaking fuel tank system.

12. A method for testing the operability of a tank shutoff valve of a fuel tank system which is controlled by valves, comprising:
a) performing a defined triggering of the tank shutoff valve, wherein the defined triggering of the tank shutoff valve includes closing the tank shutoff valve;
b) substantially simultaneous with the defined triggering, introducing one of an overpressure or partial vacuum into the fuel tank system using a pressure source, wherein the introduction of the one of the overpressure or partial vacuum into the fuel tank system occurs with a tank ventilation valve that is closed; and
c) determining the operability of the tank shutoff valve on the basis of a detected variable which characterizes the introduction of the one of the overpressure or partial vacuum;
wherein if the detected variable which characterizes the introduction of the one of the overpressure or partial vacuum has a different time gradient in the case of the tank shutoff valve triggered to close in comparison to a predefined reference time gradient which characterizes a closed tank shutoff valve, the tank shutoff valve is determined to be jammed in the open position; and
wherein if the detected variable which characterizes the introduction of the one of the overpressure or partial vacuum has a time gradient corresponding to the predefined reference time gradient which characterizes a closed tank shutoff valve, the tank shutoff valve is subsequently triggered to open, and the tank shutoff valve is determined to be jammed in the closed position if the increase over time of the variable which characterizes the introduction of the one of the overpressure or partial vacuum does not subsequently change.

13. A non-transitory computer-readable data storage medium storing a computer program having program codes which, when executed on a computer, perform a method for determining whether a tank shutoff valve of a fuel tank system which is controlled by valves is jammed in a closed or open position, the method comprising:
a) performing a defined triggering of the tank shutoff valve, wherein the defined triggering includes opening the tank shutoff valve;
b) substantially simultaneous with the defined triggering, introducing one of an overpressure or partial vacuum into the fuel tank system using a pressure source, wherein the introduction of one of the overpressure or partial vacuum into the fuel tank system occurs with a tank ventilation valve that is closed; and
c) determining the operability of the tank shutoff valve on the basis of a detected variable which characterizes the introduction of the one of the overpressure or partial vacuum;
wherein if the detected variable which characterizes the introduction of the one of the overpressure or partial vacuum has a different time gradient in the case of the tank shutoff valve triggered to open in comparison to a predefined reference time gradient which characterizes an open tank shutoff valve, the tank shutoff valve is determined to be jammed in the closed position; and
wherein if the detected variable which characterizes the introduction of the one of the overpressure or partial vacuum has a time gradient corresponding to the predefined reference time gradient which characterizes an open tank shutoff valve, the tank shutoff valve is subsequently triggered to close, and the tank shutoff valve is determined to be jammed in the open position if the increase over time of the variable which characterizes the introduction of the one of the overpressure or partial vacuum does not subsequently change.

14. A non-transitory computer-readable data storage medium storing a computer program having program codes which, when executed on a computer, perform a method for testing the operability of determining whether a tank shutoff valve of a fuel tank system which is controlled by valves is jammed in a closed or open position, the method comprising:
a) performing a defined triggering of the tank shutoff valve, wherein the defined triggering of the tank shutoff valve includes closing the tank shutoff valve;
b) substantially simultaneous with the defined triggering, introducing one of an overpressure or partial vacuum into the fuel tank system using a pressure source, wherein the introduction of the one of the overpressure or partial vacuum into the fuel tank system occurs with a tank ventilation valve that is closed; and
c) determining the operability of the tank shutoff valve on the basis of a detected variable which characterizes the introduction of the one of the overpressure or partial vacuum;
wherein if the detected variable which characterizes the introduction of the one of the overpressure or partial vacuum has a different time gradient in the case of the tank shutoff valve triggered to close in comparison to a predefined reference time gradient which characterizes a closed tank shutoff valve, the tank shutoff valve is determined to be jammed in the open position; and
wherein if the detected variable which characterizes the introduction of the one of the overpressure or partial vacuum has a time gradient corresponding to the predefined reference time gradient which characterizes a closed tank shutoff valve, the tank shutoff valve is subsequently triggered to open, and the tank shutoff valve is determined to be jammed in the closed position if the increase over time of the variable which characterizes the introduction of the one of the overpressure or partial vacuum does not subsequently change.

* * * * *